(12) United States Patent
Daniel (10) Patent No.: US 8,718,446 B1
(45) Date of Patent: May 6, 2014

(54) SYSTEM AND METHOD FOR WATERMARKING VIDEO CONTENT

(76) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 13/234,590

(22) Filed: Sep. 16, 2011

Related U.S. Application Data (60) Provisional application No. 61/383,675, filed on Sep. 16, 2010.

(51) Int. Cl.
*H04N 9/80* (2006.01)
(52) U.S. Cl.
USPC .......................................... 386/260
(58) Field of Classification Search
USPC .......... 386/239, 248, 252, 254, 257, 259, 260
See application file for complete search history.

(56) References Cited

U.S. PATENT DOCUMENTS

| | | | | |
|---|---|---|---|---|
| 5,809,139 | A * | 9/1998 | Girod et al. | 380/202 |
| 6,809,792 | B1 * | 10/2004 | Tehranchi et al. | 352/85 |
| 2002/0059522 | A1 * | 5/2002 | Hirano et al. | 713/193 |
| 2003/0026422 | A1 * | 2/2003 | Gerheim et al. | 380/210 |

\* cited by examiner

*Primary Examiner* — Tat Chio
(74) *Attorney, Agent, or Firm* — Alberto Interian, III, Esq.

(57) ABSTRACT

A system comprising at least one processor, and computer executable instructions readable by the at least one processor and operative to include at least one digital watermark in at least one piece of video content, wherein said digital watermark is invisible to the naked eye in an original recording of the at least one piece of video content but is visible to the naked eye in a recorded copy of the at least one piece of video content.

20 Claims, 6 Drawing Sheets

SYSTEM AND METHOD FOR WATERMARKING VIDEO CONTENT

PRIORITY CLAIM

The present application is a non-provisional application of U.S. provisional patent application Ser. No. 61/383,675, titled "System and Method for Watermarking Video Content", filed on Sep. 16, 2010, which is hereby incorporated by reference as if fully stated herein, and whose priority is hereby claimed.

FIELD

The present disclosure relates generally to electronic systems, and more particularly, to systems, methods, and various other disclosures related to the watermarking of video content, and, more specifically, to digital watermarking.

BACKGROUND

It is common practice for media content providers, such as television networks, movie studios, and the like, to include watermarks along with the content they distribute. Watermarks serve many purposes, but for copyright protection and enforcement, the principle purpose they serve is to identify the source of the content being distributed. For this reason, many films that are shown in movie theatres contain watermarks that contain information about the movie theatres in which the films are being displayed so that movie studios can trace pirated copies of films to the particular movie theatre in which they were pirated.

Traditionally, watermarks have been invisible to the naked eye, and require specialized watermark extraction software to analyze and/or detect the watermarks. For this reason, many media pirates and illegal copiers, such as those who illegally record films with camcorders in movie theatres, are not aware that the content they are recording contains watermarks. Since a watermark is not visible in the original content or the copied content, it is not immediately apparent to pirates whether a particular piece of content contains a watermark. Therefore, pirates may feel a greater sense of security in copying the content and may not be deterred from copying the content.

SUMMARY

The various systems, methods, and embodiments described herein result from the realization that illegal copying and pirating of copyrighted content may be deterred by providing systems and methods for including a digital watermark in at least one piece of video content, wherein the digital watermark is invisible to the naked eye in the original piece of video content, but becomes visible to the naked eye in a recorded copy, thereby alerting copiers that the content is watermarked.

Accordingly, the various embodiments and disclosures described herein solve the limitations of the prior art in a new and novel manner.

DETAILED DESCRIPTION OF PREFERRED EMBODIMENTS

System Level Overview

Figure 1A:
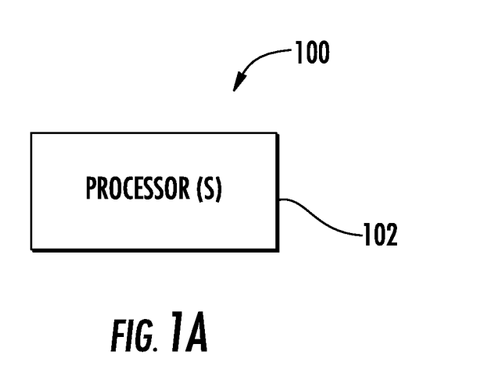
FIG. 1A shows a system in accordance with one embodiment.
Figure 1B:
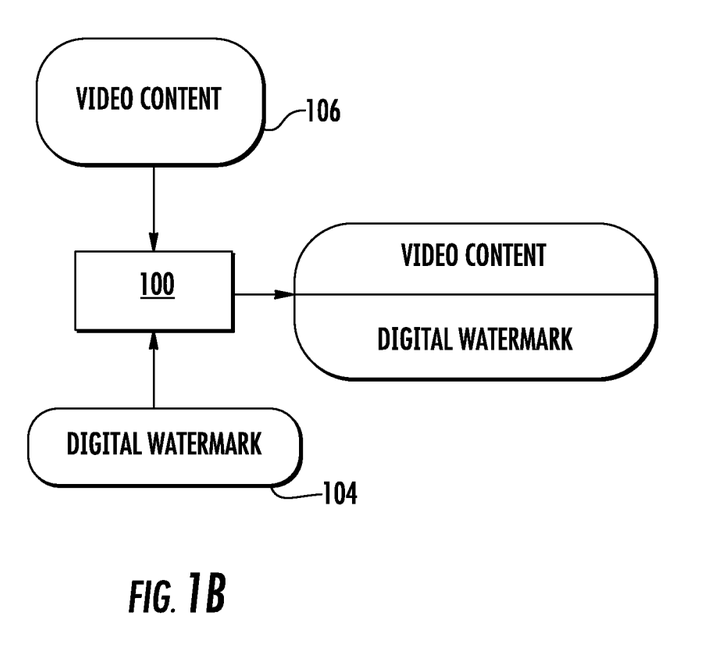
FIG. 1B shows a system in accordance with another embodiment.
Figure 1C:
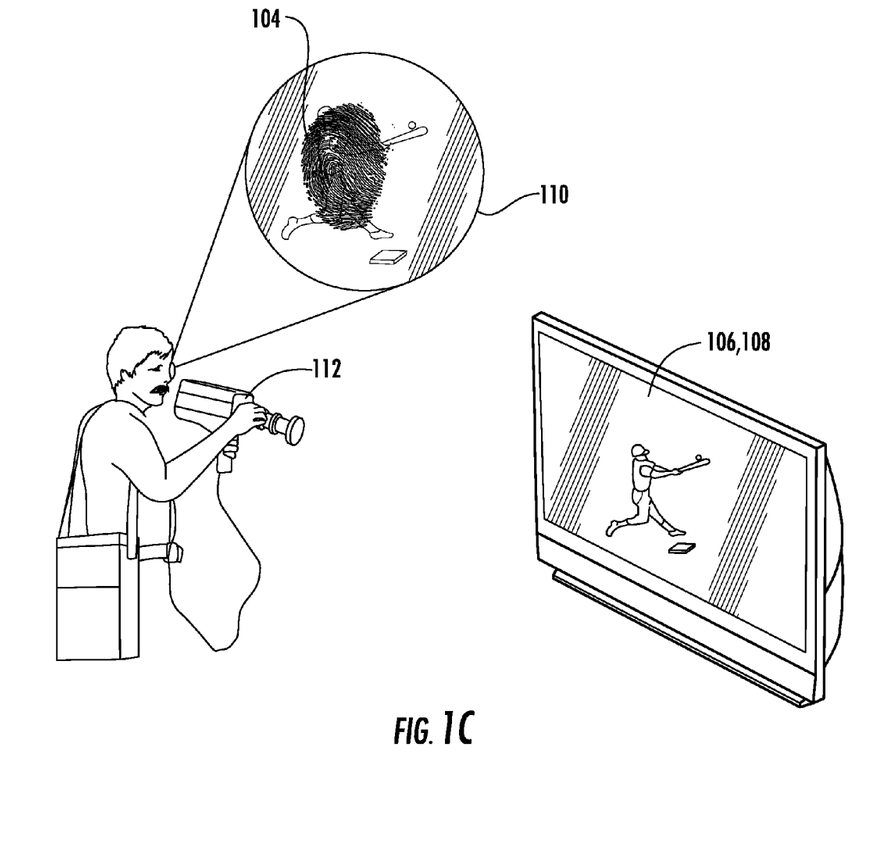
FIG. 1C shows a system in accordance with yet another embodiment.

FIGS. 1A through 1C show a system 100 in accordance with various embodiments. In one embodiment, as shown in FIG. 1A, a system 100, comprises of at least one processor 102, and computer executable instructions readable by at least one processor 102 and operative to include at least one digital watermark 104 in at least one piece of video content 106, wherein digital watermark 104 may be invisible to the naked eye in an original recording 108 of at least one piece of video content 106, but may be visible to the naked eye in a recorded copy 110 of at least one piece of video content 106. The term "naked eye," as used throughout the present disclosure, refers to the visual perception of the human eye that is unaided by enhancing equipment, such as cameras, lenses, image altering devices, infrared and/or ultraviolet light viewing devices, and the like.

In one embodiment, recorded copy 110 comprises a recorded copy made using at least one video recording device 112. In some embodiments, at least one video recording device 112 may be any type of video recording device, including, but not limited to, a camcorder, a digital video recorder, a camera, audio, and a tape recorder.

In some embodiments, at least one processor 102 may be any kind of processor, including, but not limited to, a single core processor, a multi core processor, a video processor, and the like. At least one processor 102 may be electronically connected to or integrated with at least one computer, at least one set top box, at least one server, or any other device that broadcasts or plays media.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like, wherein said computer readable media may be connected to at least one processor 102. The terms "connected," "connection," "electronically connected," or "electronic connection," as used herein, may refer to any type of electronic connection or electronic communication, such as wired or wireless electronic connections or electronic communications, which may include means and devices such as cables, wires, wireless communications modules, such as WiFi, Bluetooth, and the like. The computer executable instructions may be any type of computer executable instructions, which may be in the form of a computer program, the program being composed in any suitable programming language or source code, such as C++, C, JAVA, JavaScript, HTML, XML, and other programming languages.

In some embodiments, at least one digital watermark 104 may comprise any type of digital watermark, such as, but not limited to, meta data, identification information, such as, but not limited to, biometric identification information, which may include information relating to at least one fingerprint, iris, voice recognition, which may include, an image of a fingerprint, or the biometric identification points of a fingerprint. In some embodiments, the identification information may be collected from the audience or person who is playing at least one piece of video content 106, such as by requiring an audience member to submit their biometric information using a biometric information collection device, such as by requiring the audience member to scan their fingerprint using a fingerprint scanner, and then using that fingerprint as digital watermark 104.

In another embodiment, the biometric information may be required to be submitted by a user of a recording device, such as through a biometric information input device (e.g. fingerprint scanner) connected to the recording device.

In some embodiments, at least one piece of video content 106 may be any type of video content, such as, but not limited to, sports content, movie content, television content, photographs, news content, and the like.

In some embodiments, including at least one digital watermark 104 in at least one piece of video content 106 comprises overlaying at least one digital watermark 104 with at least one piece of video content 106. In various embodiments, the overlaying method used to overlay watermark 104 with video content 106 may be any of the various watermark overlaying methods known in the art.

In a further embodiment, overlaying at least one digital watermark 104 with at least one piece of video content comprises overlaying at least one digital watermark 104 with at least one piece of video content 106 at at least one frequency that is invisible to the naked eye in an original recording 108 of at least one piece of video content 106 but becomes visible to the naked eye in a re-recording 110 of at least one piece of video content 106 when re-recording 110 is recorded using a video recording device 112. In some embodiments, the at least one frequency at which at least one digital watermark 104 is overlaid with at least one piece of video content 106 may be a frequency which is not a multiple of 25 Hz, since a complete picture is captured by a human eye in $\frac{1}{25}^{th}$ of a second, or, in other words, 25 Hz. In some embodiments, the at least one frequency may be 60 Hz or 85 Hz. In one embodiment, at least one digital watermark 104 may be overlaid with at least one piece of video content 106 at a varying frequency. In some embodiments, this may not only help to avoid visibility by the naked eye in the original content, but to also ensure that a variety of different video recording devices, which may operate at different recording frequencies, record and show digital watermark 104 in recorded copy 110. In a further embodiment, the frequency at which digital watermark 104 is displayed may be complementary to the frequency at which the recording device captures data, such as images. In a further embodiment, and industry standard may be established so that most, if not all, recording devices are designed to capture digital watermark 104 in the original content, and then make it visible in the recorded content, such as by having a industry standard recording frequency that compliments the frequency at which digital watermark 104 is displayed, amongst other strategies.

In some embodiments, video recording device 112 may be any type of video recording device, such as, but not limited to, a camcorder, a digital video recorder, a videotape recorder, a camera, and the like.

Figure 1D:
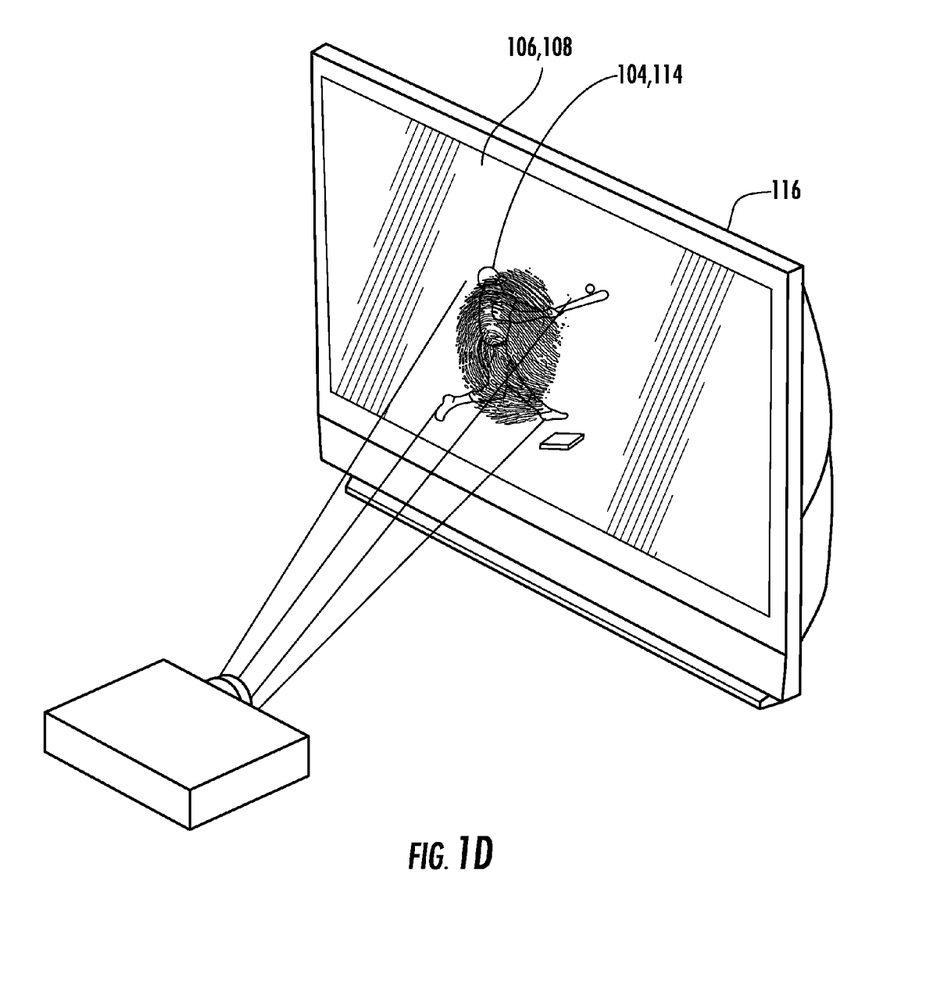
FIG. 1D shows a system in accordance with yet another embodiment.

Referring now to FIG. 1D, an embodiment of system 100 is shown wherein including at least one digital watermark 104 in at least one piece of video content 106 comprises projecting at least one infrared image 114 of at least one digital watermark 104 on or near at least one display device 116 displaying at least one piece of video content 106. In some embodiments, infrared image 114 may be invisible to the naked eye while the at least one piece of video content 106 is being displayed on at least one display device 116, but becomes visible to the naked eye when recorded by at least one recording device. In other embodiments, digital watermark 104 may be projected as infrared image 114 or an image in visible light, which may be projected at a single frequency or varying frequencies, such as those frequencies described above with reference to FIG. 1C.

Overview of Method Embodiments

Figure 2A:
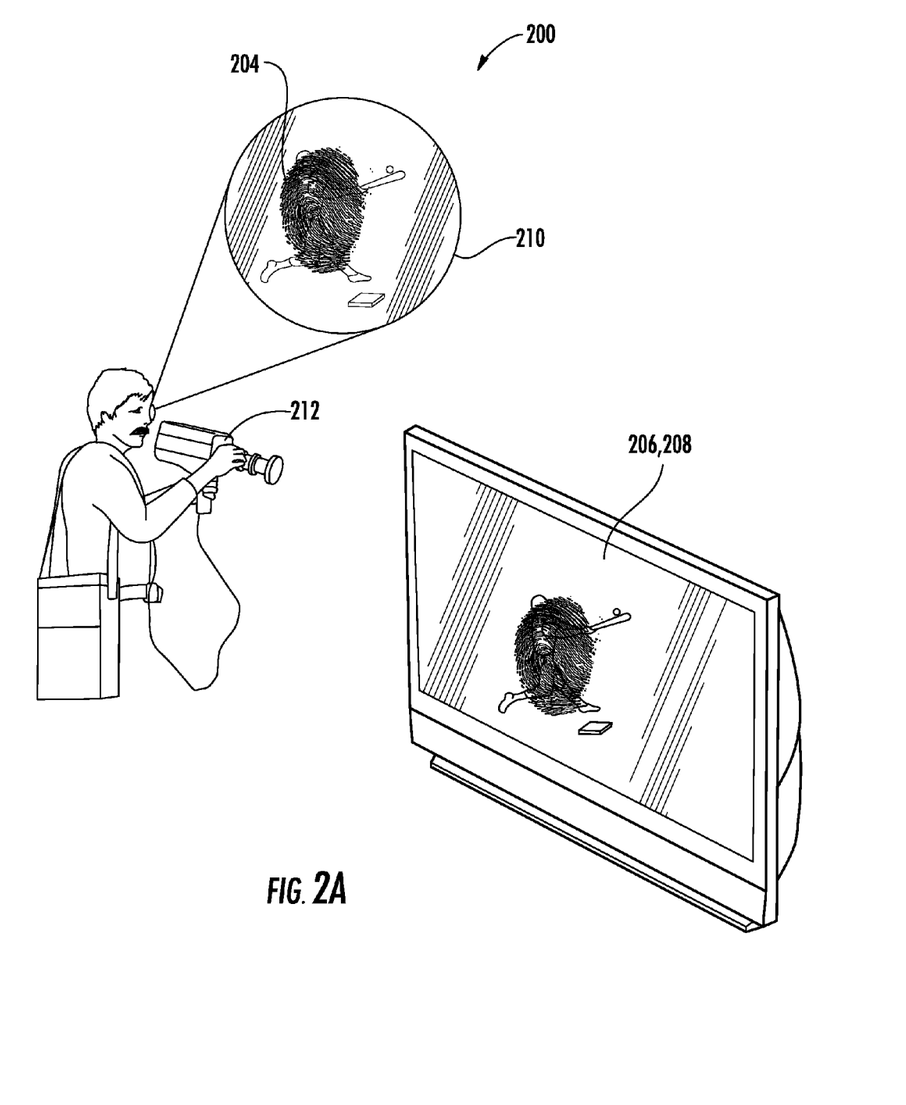
FIG. 2A shows a scene depicting the implementation of a method in accordance with one embodiment.
Figure 2B:
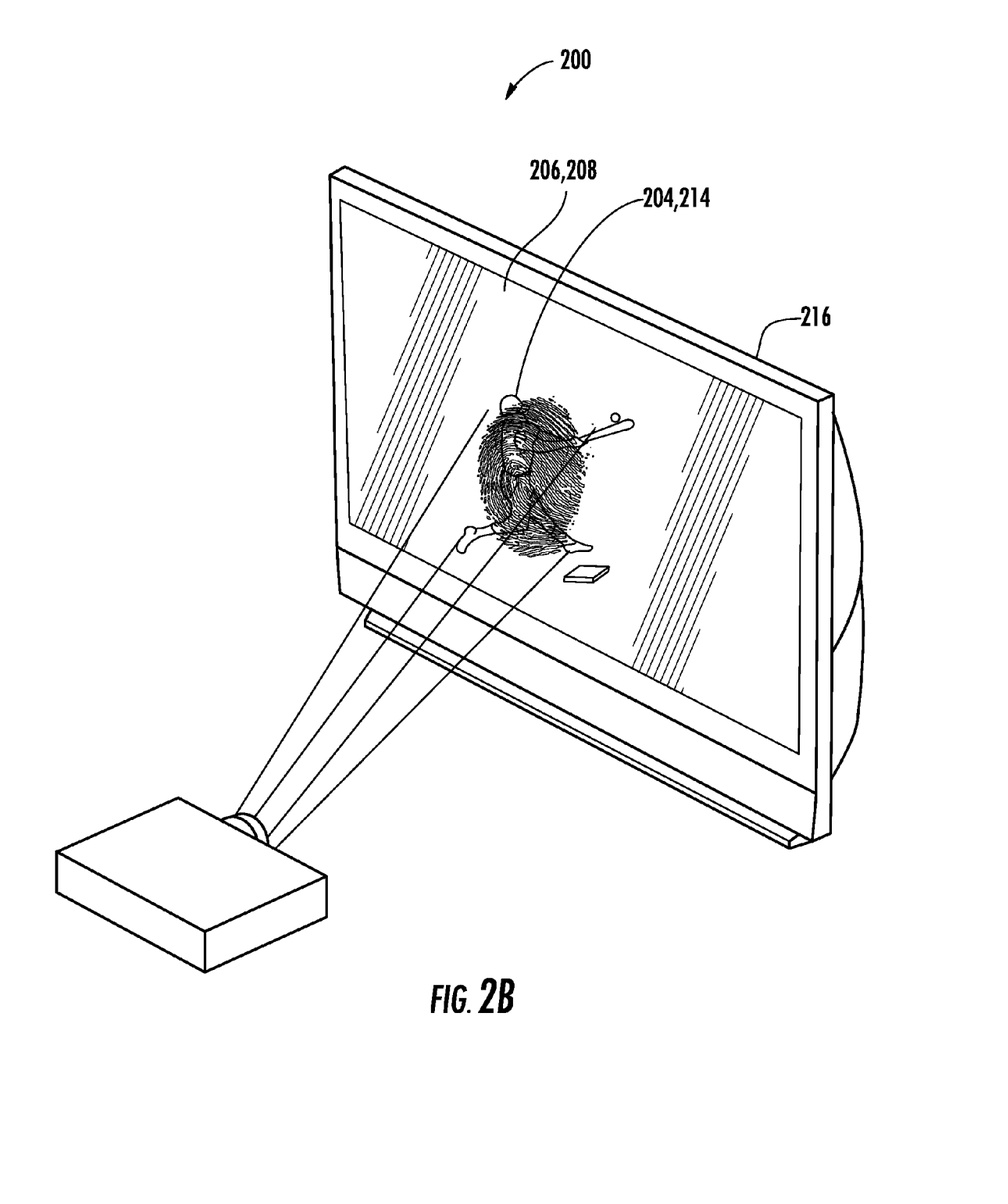
FIG. 2B shows a scene depicting the implementation of a method in accordance with yet another embodiment.

Referring now to FIGS. 2A and 2B, scenes depicting the implantation of method 200 are shown, wherein method 200 comprises using at least one processor (not shown) to perform any or all of the following: including at least one digital watermark 204 in at least one piece of video content 206, wherein digital watermark 204 may be invisible to the naked eye in an original recording 208 of at least one piece of video content 206, but may be visible to the naked eye in a recorded copy 210 of at least one piece of video content 206.

In one embodiment, recorded copy 210 comprises a recorded copy made using at least one video recording device 212. In some embodiments, at least one video recording device 212 may be any type of video recording device, including, but not limited to, a camcorder, a digital video recorder, a camera, and a tape recorder.

In some embodiments, the at least one processor may be any kind of processor, including, but not limited to, a single core processor, a multi core processor, a video processor, and the like. The at least one processor may be electronically connected to or integrated with at least one computer, at least one set top box, at least one server, or any other device that broadcasts or plays media.

In some embodiments, method 200 may be carried out by computer executable instructions. The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like, wherein said computer readable media may be connected to the at least one processor. The terms "connected," "connection," "electronically connected," or "electronic connection," as used herein, may refer to any type of electronic connection or electronic communication, such as wired or wireless electronic connections or electronic communications, which may include means and devices such as cables, wires, wireless communications modules, such as WiFi, Bluetooth, and the like. The computer executable instructions may be any type of computer executable instructions, which may be in the form of a computer program, the program being composed in any suitable programming language or source code, such as C++, C, JAVA, JavaScript, HTML, XML, and other programming languages.

In some embodiments, at least one digital watermark 204 may comprise any type of digital watermark, such as, but not limited to, meta data, identification information, such as, but not limited to, biometric identification information, which may include information relating to at least one fingerprint, iris, voice recognition, which may include, an image of a fingerprint, or the biometric identification points of a fingerprint. In some embodiments, the identification information may be collected from the audience or person who is playing at least one piece of video content 206, such as by requiring an audience member to submit their biometric information using a biometric information collection device, such as by requiring the audience member to scan their fingerprint using a fingerprint scanner, and then using that fingerprint as digital watermark 204.

In some embodiments, at least one piece of video content 206 may be any type of video content, such as, but not limited to, sports content, movie content, television content, photographs, news content, and the like.

In some embodiments, including at least one digital watermark 204 in at least one piece of video content 206 comprises overlaying at least one digital watermark 204 with at least one piece of video content 206. In various embodiments, the overlaying method used to overlay watermark 204 with video content 206 may be any of the various watermark overlaying methods known in the art.

In a further embodiment, overlaying at least one digital watermark 204 with at least one piece of video content comprises overlaying at least one digital watermark 204 with at least one piece of video content 206 at at least one frequency that is invisible to the naked eye in an original recording 208 of at least one piece of video content 206 but becomes visible to the naked eye in a re-recording 210 of at least one piece of video content 206 when re-recording 210 is recorded using a video recording device 212. In some embodiments, the at least one frequency at which at least one digital watermark 204 is overlaid with at least one piece of video content 206 may be a frequency which is not a multiple of 25 Hz, since a complete picture is captured by a human eye in $\frac{1}{25}^{th}$ of a second, or, in other words, 25 Hz. In some embodiments, the at least one frequency may be 60 Hz or 85 Hz. In one embodiment, at least one digital watermark 204 may be overlaid with at least one piece of video content 206 at a varying frequency. In some embodiments, this may be advantages to help not only to avoid visibility by the naked eye in the original content, but to ensure that a variety of different video recording devices, which may operate at different recording frequencies, record and show digital watermark 204 in recorded copy 210.

In some embodiments, video recording device 212 may be any type of video recording device, such as, but not limited to, a camcorder, a digital video recorder, a videotape recorder, a camera, and the like.

Referring now to FIG. 2B, a scene depicting the implementation of method 200 in accordance with one embodiment is shown wherein including at least one digital watermark 204 in at least one piece of video content 206 comprises projecting at least one infrared image 214 of at least one digital watermark 204 on or near at least one display device 216 displaying at least one piece of video content 206. In some embodiments, infrared image 214 may be invisible to the naked eye while the at least one piece of video content 206 is being displayed on at least one display device 216, but becomes visible to the naked eye when recorded by at least one recording device. In other embodiments, digital watermark 204 may be projected as infrared image 214 or an image in visible light, which may be projected at a single frequency or varying frequencies, such as those frequencies described above with reference to FIG. 2A.

Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 3 below.

Figure 3:
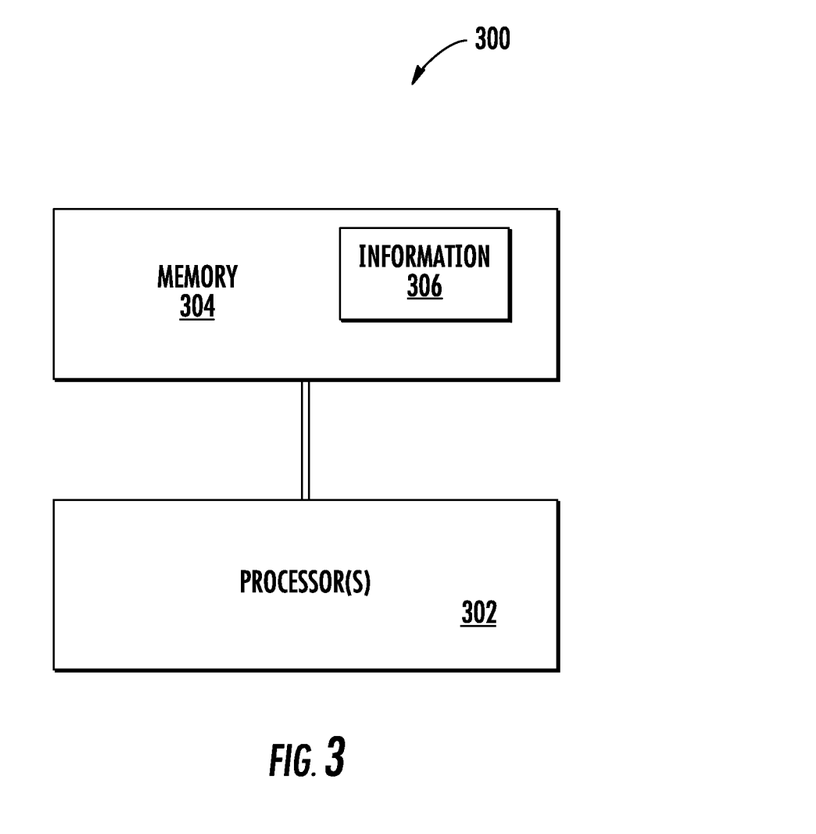
FIG. 3 shows a block diagram depicting an article in accordance with one embodiment.

FIG. 3 is a block diagram representing an article according to various embodiments. Such embodiments may comprise a computer, a memory system, a magnetic or optical disk, some other storage device, or any type of electronic device or system. The article 300 may include one or more processor(s) 302 coupled to a machine-accessible medium such as a memory 304 (e.g., a memory including electrical, optical, or electromagnetic elements). The medium may contain associated information 306 (e.g., computer program instructions, data, or both) which, when accessed, results in a machine (e.g., the processor(s) 302) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for deterring illegal copying and pirating of content comprising:
   a. at least one processor;
   b. a biometric information collection device; and
   c. computer executable instructions readable by the at least one processor and operative to:
      i. use the biometric information collection device to collect biometric identification information from a user of a content recording device or a content playing device; and
      ii. overlay an image of the user's biometric identification information on at least one piece of video content being recorded by the content recording device or played by the content playing device, the image of the user's biometric identification information is invisible to a naked eye in an original recording of the at least one piece of video content but is visible to the naked eye in a recorded copy of the at least one piece of video content.

2. The system of claim 1, wherein the biometric information collection device is connected to the at least one.

3. The system of claim 1, wherein the user's biometric identification information comprises at least one fingerprint, fingerprint points, an iris, or a voice.

4. The system of claim 1, wherein overlaying an image of the user's biometric identification information comprises overlaying an image of the user's fingerprint or biometric identification points of the user's fingerprint.

5. The system of claim 1, wherein overlaying an image of the user's biometric identification information on at least one piece of video content comprises overlaying an image of the user's biometric identification information on at least one piece of video content at at least one frequency that is invisible to the naked eye in an original recording of the at least one piece of video content but becomes visible to the naked eye in a re-recording of the at least one piece of video content when the re-recording is recorded using a video recording device.

6. The system of claim 1, wherein using the biometric information collection device to collect biometric identification from a user of a content recording device or a content playing device comprises using the biometric information collection device to collect biometric identification information from a member of an audience of the at least one piece of video content or a person playing the at least one piece of video content.

7. The system of claim 1, wherein including an image of the user's biometric identification information in at least one piece of video content comprises projecting at least one infrared image of the image of the user's biometric identification information on or near at least one display device displaying the at least one piece of video content.

8. The system of claim 1, wherein the recorded copy of the at least one piece of video content comprises a recorded copy of the at least one piece of video content made using the content recording device.

9. The system of claim 1, wherein using the biometric information collection device to collect biometric identification from a user of a content recording device or a content playing device comprises using the biometric information collection device to collect biometric identification information from an operator of the content recording device or the content playing device.

10. A method for deterring illegal copying and pirating of content comprising using at least one processor to perform the following:
   a. using a biometric information collection device to collect biometric identification information from a user of a content recording device or a content playing device; and
   b. overlaying an image of the user's biometric identification information on at least one piece of video content, wherein the image of the user's biometric identification information is invisible to a naked eye in an original recording of the at least one piece of video content but is visible to the naked eye in a recorded copy of the at least one piece of video content.

11. The method of claim 10, wherein the user comprises a potential content pirate or illegal copier.

12. The method of claim 10, wherein the biometric identification information comprises at least one fingerprint, fingerprint points, an iris, or a voice.

13. The method of claim 10, wherein overlaying an image of the user's biometric identification information comprises overlaying an image of the user's fingerprint or biometric identification points of the user's fingerprint.

14. The method of claim 10, wherein overlaying an image of the user's biometric identification information on at least one piece of video content comprises overlaying an image of the user's biometric identification information on at least one piece of video content at, at least one frequency that is invisible to the naked eye in an original recording of the at least one piece of video content but becomes visible to the naked eye in a re-recording of the at least one piece of video content when the re-recording is recorded using a video recording device.

15. The method of claim 10, wherein using the biometric information collection device to collect biometric identification from a user of a content recording device or a content playing device comprises using the biometric information collection device to collect biometric identification information from a member of an audience of the at least one piece of video content or a person playing the at least one piece of video content.

16. The method of claim 10, wherein including an image of the user's biometric identification information in at least one piece of video content comprises projecting at least one infrared image of the image of the user's biometric identification information on or near at least one display device displaying the at least one piece of video content.

17. The method of claim 10, wherein the recorded copy of the at least one piece of video content comprises a recorded copy of the at least one piece of video content made using the content recording device.

18. The method of claim 10, wherein using the biometric information collection device to collect biometric identification from a user of a content recording device or a content playing device comprises using the biometric information collection device to collect biometric identification information from an operator of the content recording device or the content playing device.

19. A non-transitory computer readable medium comprising executable instructions which when executed by at least one processor cause the at least one processor to perform the following:
   a. use a biometric information collection device to collect biometric identification information from a user of a content recording device or a content playing device; and
   b. overlay an image of the user's biometric identification information on at least one piece of video content being recorded by the content recording device or played by the content playing device, wherein the image of the user's biometric identification information is invisible to the naked eye in an original recording of the at least one piece of video content but is visible to the naked eye in a recorded copy of the at least one piece of video content.

20. The non-transitory computer readable medium of claim 19, wherein using the biometric information collection device to collect biometric identification from a user of a content recording device or a content playing device comprises using the biometric information collection device to collect biometric identification information from a member of an audience of the at least one piece of video content or a person playing the at least one piece of video content.

* * * * *